United States Patent
Blanc et al.

(10) Patent No.: US 6,570,845 B1
(45) Date of Patent: May 27, 2003

(54) SWITCHING SYSTEM INCLUDING A MASK MECHANISM FOR ALTERING THE INTERNAL ROUTING PROCESS

(75) Inventors: Alain Blanc, Vence (FR); Bernard Brezzo, Nice (FR); Alain Saurel, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,322

(22) Filed: May 24, 1999

(30) Foreign Application Priority Data

May 29, 1998 (EP) ............................................. 98480041

(51) Int. Cl.$^7$ .......................... G06F 11/00; H04L 12/56
(52) U.S. Cl. ........................ 370/218; 370/235; 370/412
(58) Field of Search ................................. 370/216, 217, 370/218, 219, 220, 225, 389, 381, 388, 392, 412, 414, 416, 229, 235, 413

(56) References Cited

U.S. PATENT DOCUMENTS

| | | | | |
|---|---|---|---|---|
| 4,707,781 A | * | 11/1987 | Sullivan et al. ............. | 711/147 |
| 5,287,537 A | * | 2/1994 | Newmark et al. .......... | 395/800 |
| 5,430,720 A | | 7/1995 | Larsson et al. ............... | 370/60 |
| 5,610,913 A | * | 3/1997 | Tomonaga et al. .......... | 370/219 |
| 6,108,334 A | * | 8/2000 | Blanc et al. ................. | 370/389 |
| 6,125,114 A | * | 9/2000 | Blanc et al. ................. | 370/389 |
| 6,324,164 B1 | * | 11/2001 | Luijten et al. .............. | 370/230 |

FOREIGN PATENT DOCUMENTS

EP      0652685 A2      5/1995

OTHER PUBLICATIONS

IBM Technical Disclosure Bulletin, vol. 34, No. 10A, Mar. 1992, pp. 464–465, XP000302372 *the whole document* .

\* cited by examiner

*Primary Examiner*—Seema S. Rao
*Assistant Examiner*—Ronald Abelson
(74) *Attorney, Agent, or Firm*—Carlos Munoz-Bustamante

(57) ABSTRACT

A switching system receives a data cell from a set of n input ports for routing to one or more output ports in accordance with the contents of a bitmap value retrieved from the cell upon its receipt. The system has a module comprising a shared buffer for storing the cells which are to be routed and a mask mechanism with a mask register for altering the value of the bitmap before it is used for controlling the routing process. As a result of operation of the mask mechanism, a cell is either transported to an output port or discarded. Two switching systems are combined in first and second switch fabrics, each having a switch core and a set of switch core access layer (SCAL) elements. Each SCAL element respectively comprises a SCAL Receive element and a SCAL Xmit element for permitting access to input and output ports of one of the switching systems.

3 Claims, 5 Drawing Sheets

SWITCHING SYSTEM INCLUDING A MASK MECHANISM FOR ALTERING THE INTERNAL ROUTING PROCESS

TECHNICAL FIELD OF THE INVENTION

The invention relates to telecommunication products and more particularly to a switching system including a mask mechanism for altering the internal routing process of a switching system.

BACKGROUND ART

The invention is an improvement to prior art switching systems employing a shared buffer, and particularly to a system disclosed in European patent applications n° 97480057.5, 97480056.7, 97480065.8, 96480129.4, 96480120.3 assigned to the assignee of the present application.

Shared buffer switching is very useful for routing small cells of data such as ATM cells having a limited number of bytes; generally 53 bytes. The high transmission rates that are needed today thus require the switching of a great number of data cells. The switching process is however limited by the physical storage capacity of the buffer, where the cells are stored prior to their routing to the appropriate port destinations. In case of multicasting (nearly simultaneous distribution of the same cell to multiple destinations) a cell occupies its location within the shared buffer as long as the duplication operations required for multicasting are still pending, which takes a relatively long time when a contention occurs in one port of the switch. In the system described in the above mentioned European applications, the shared buffer has 128 locations used for the storage of the cells prior to their routing towards the appropriate output ports.

It is highly desirable to expand the capability of the switching architecture by possibly allowing the combination of elementary switching modules. The above mentioned European applications describe speed expansion, and port expansion architectures which respectively allow the expansion of the switching rate and the number of ports of the switching architecture. By doubling the number of switching modules by two it is possible to double the speed of the switch. Using four modules in combination makes it possible to double the number of ports of the switch.

However, in these situations, the buffer remains limited to 128 storage locations which inevitably limits the possibilities of the switch and increases the risks of contention.

SUMMARY OF THE INVENTION

It is an object of the present invention to provide a switching architecture that can benefit from the individual storage resources of first and second switching systems in order to expand the capabilities of the switch.

It is another object of the present invention to provide a shared buffer switching architecture which supports speed expansion, port expansion and buffer expansion.

It is a further object of the present invention to provide a switching architecture that can aggregate individual switching systems in order to enhance the switching performance.

These and other objects are achieved by a switching system including a set of input port adapters on which cells may be received, each cell carrying a bitmap value, and a set of output port adapters to which cells may be routed. The system further includes a mask register for altering the value of the bitmap and a module for performing a cell routing process. The module includes a shared buffer for temporarily storing cells which are received and logic for controlling the routing of each cell as a function of the bitmap value produced by the mask mechanism.

DESCRIPTION OF PREFERRED EMBODIMENT

Figure 1:
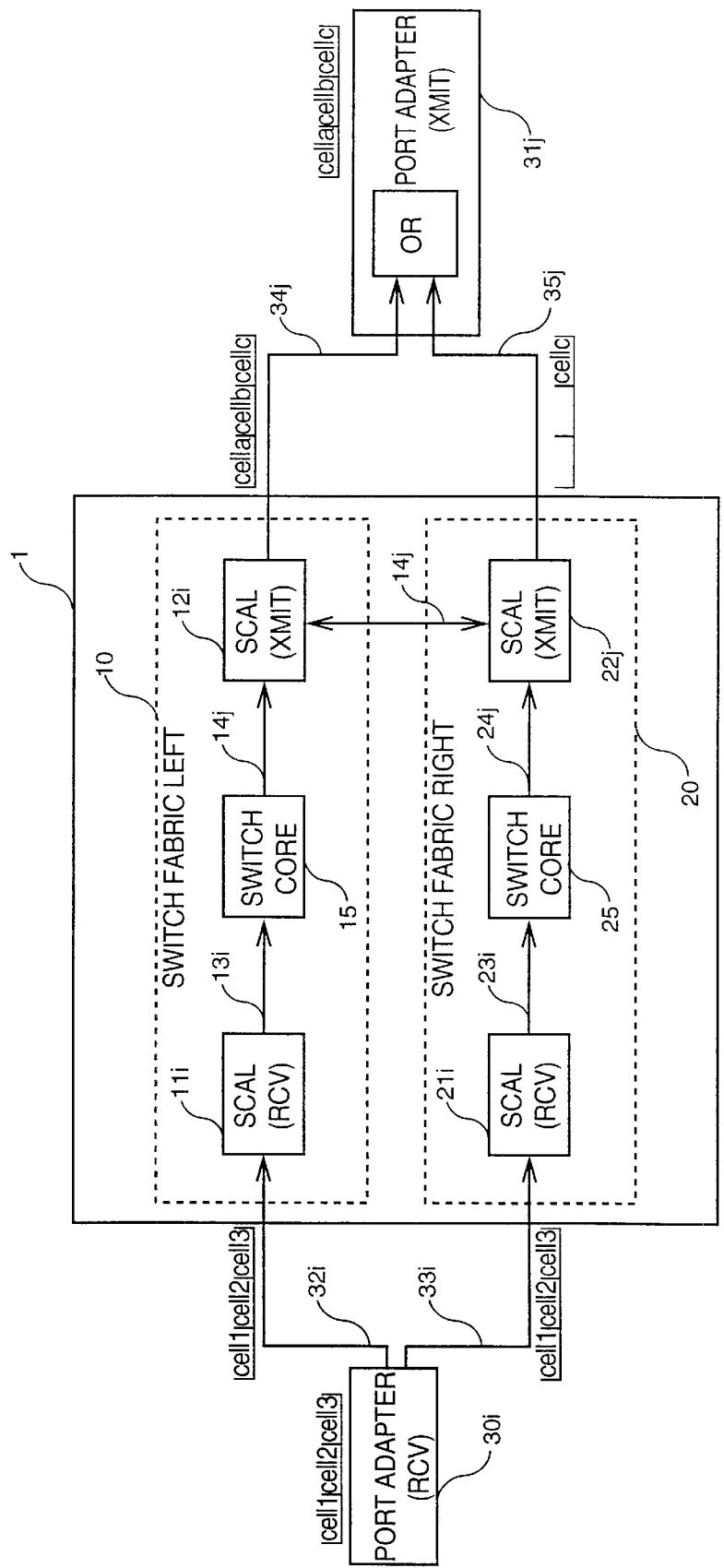
FIG. 1 illustrates the basic architecture of the invention using two shared buffer switching structures.

FIG. 1 shows a switch fabric structure capable of using the storage capacity of two individual and identical switch fabrics 10 and 20 that conform, in the preferred embodiment of the invention, to the teaching of the above mentioned European patent applications. However, the invention can be used with other embodiments of switches based on a shared buffer, particularly switch fabrics that include queuing resources at the output of the switching components. The switch fabrics 10 and 20 include, respectively, switch cores 15 and 25 (which are normally located in the same physical area) and a set of switch core access layers (SCAL) elements 11$i$, 12$j$ and 21$i$, 22$j$ which may be located in different physical areas depending on the physical topology of the network.

For the sake of simplicity, a single input port and a single output port are shown in FIG. 1. In a practical structure, there would be multiple input ports and multiple output ports. In the example, the receive side of the switch fabric is associated with port i, and consequently the SCAL receive elements, identified as elements 11-$i$ and 21-$i$, are attached to port adapter 30-$i$. The output of the switch is said to be associated with an output port j. SCAL Xmit elements 12-$j$ and 22-$j$ respectively are attached to a port adapter 31-$j$.

From a functional point of view, port adapter receive 30-$i$ produces a sequence of cells, which are simultaneously transmitted to the corresponding SCAL receive element 11-$i$ in the switch fabric 10 through the link 32-$i$; and to the SCAL receive 21-$i$ in the switch fabric 20 through the link 33-$i$. Generally speaking each SCAL receive element 11-$i$ and 21-$i$ is connected to its corresponding switch core via a set of n serializing links 13-$i$ and 23-$i$ permitting the communication between the SCAL physical location and the switch core physical location Similarly, the two switch cores 15 and 25 are respectively connected to their corresponding SCAL transmit parts 12-$j$ and 22-$j$ via a set of n serialized links 14-$j$ and 24-$j$. The cells which are produced by the two SCAL Xmit elements 12-$j$ and 22-$j$ are transported through the links 34-$j$ and 35-$j$ respectively to the port adapter (Xmit) 31-$j$.2.

Figure 2:
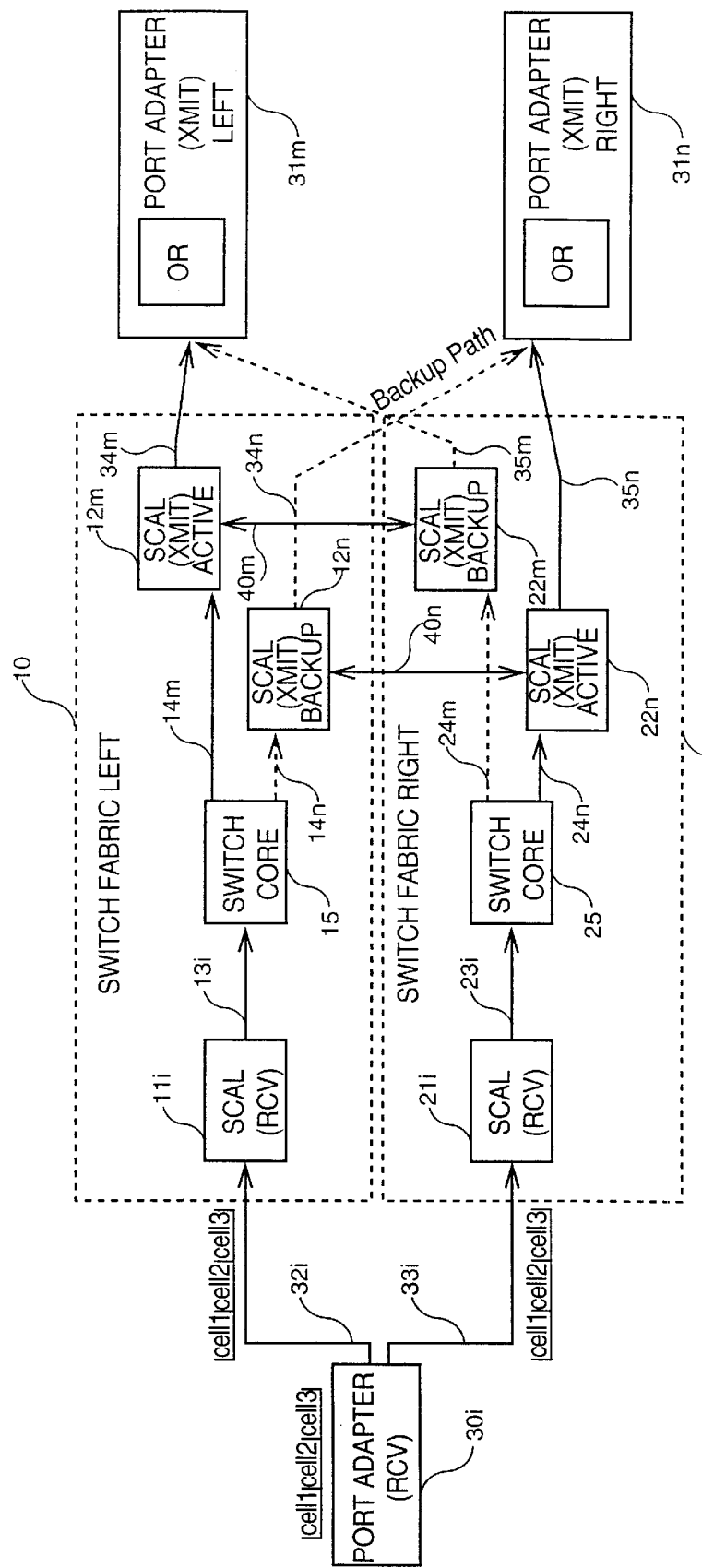
FIG. 2 illustrates the basic architecture with added details.

FIG. 2 adds details to the structure of the switch. Basically, the invention repartitions the output ports of the switch subsystem 1 and the Xmit Adapter elements into two groups: a LEFT group that will be assigned to switch fabric 10 (Left) and will normally receive the traffic cells from the latter and a RIGHT group that is assigned to the switch fabric 20 and which normally receives the traffic cells from the latter. In the preferred embodiment of the invention, the load balancing of the data cells is achieved with two separate LEFT and RIGHT switch fabrics. However, the system could be enhanced by increasing the number of switching paths. The port adapter Xmit element 31(m) is assigned to the LEFT group while the port adapter Xmit 31(n) element is included in the RIGHT group.

Additionally, each switch fabric path, e.g. switch fabric 10, comprises SCAL Xmit elements that are divided into two groups—so called active and backup—corresponding to the repartition previously made of the port adapter Xmit elements. More particularly a port adapter Xmit 31(m)—that belongs to the LEFT group is physically connected to a corresponding SCAL Xmit element 12(m) that belongs to the active group of the switch fabric 10; and is further physically connected to a corresponding SCAL Xmit element 22(m) which belongs to the backup group of the switch fabric 20.

Similarly, the port adapter Xmit 31(n) that belongs to the RIGHT group is physically connected to a corresponding SCAL Xmit element 22(n) that belongs to the active group of the switch fabric 20; and is further physically connected to a corresponding SCAL Xmit element 12(n) which belongs to the backup group of the switch fabric 10.

The above described repartition of the port adapter Xmit elements permits effective simultaneous operation of the switch cores 15 and 25, thus combining their buffering resources. The partitioning of the port adapter Xmit elements, decided by the node manager, results in cells that are to be propagated to the port adapter Xmit 31(m) (belonging to the Left group) to be conveyed through left switch core 15 to the SCAL Xmit element 12(m), while the same cell is duplicated by the port adapter Receive 30(i) and is dropped by the switch core 25. Conversely, the cells that are to be propagated to the port adapter Xmit 31(n) will be conveyed through right switch core 25, to the SCAL Xmit element 22(n) while the same cell duplicated at the level of the port adapter Receive 30(i) will be dropped by the switch core 15. Therefore, the cells are distributed through the RIGHT and LEFT switch fabrics in accordance with the repartition that was determined by the node manager. This is achieved as follows.

In a preferred embodiment of the invention, cells which are generated by the port adapter Receive 30i are duplicated on the two serial links 32(i) and 33(i). It should be noted that this duplication is involved up to the input of the switch core 15 and 25, which is important because the two cores must receive the same cells so as to make sure that all control cells are also simultaneously received. The European patent applications mentioned above show that the switch core uses a routing table which provides bitmap information that is used inside the core for controlling the routing process. That bitmap information is generally read from the contents of control routing tables that can be updated by means of control cells. This is the reason why it is important, in this invention, that the same cells arrive at the input of each switch core. More particularly, as described in the above mentioned patent applications, port adapter Receive 30(i) generates a cell which comprises a switch routing header (SRH) and a payload.

The SRH includes a two-byte routing label characteristic of the destination of the cell, that is, a single port adapter Xmit elements in case of a unicast connection or the set of port adapter Xmit elements in case of a multicast connection. The SRH also contains a one-byte cell qualifier. The cells are received by the local SCAL Receive element 11(i) and 21(i), which introduces an additional set of two bytes that will be affected to the location of the bitmap that will be used for controlling the internal routing process inside the switch core 15 and 25. The cells are then transported to the centralized switch cores 15 and 25, which have a routing control that uses the routing label for addressing a routing control table that provides the appropriate two-bytes bitmap information that can then be used for the routing process inside the switch cores.

Figure 3:
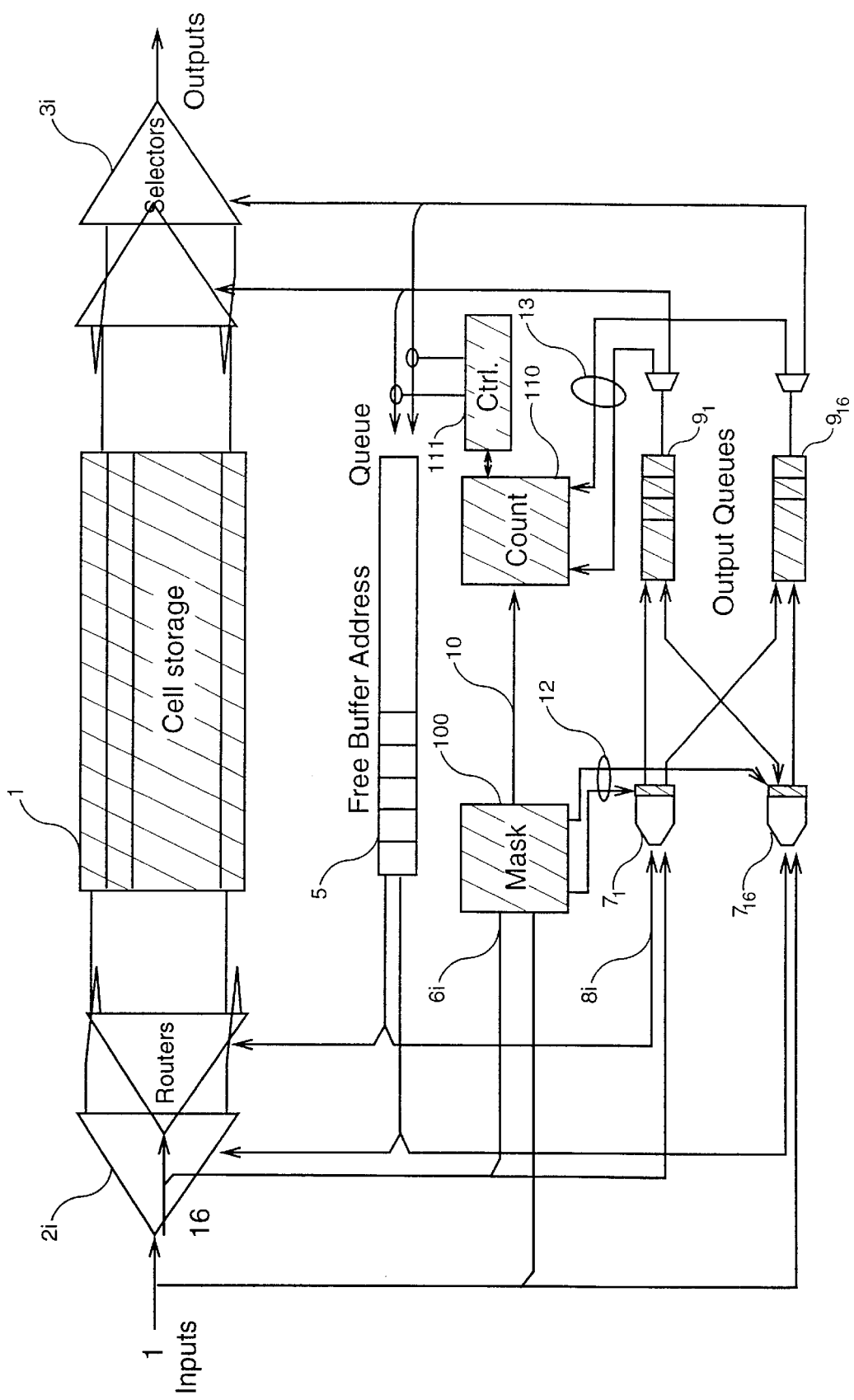
FIG. 3 is a view of an internal structure of a self-routing switching system that can be used in the preferred embodiment of the invention.

The present invention uses a mask mechanism within each switch core to represent the distribution of the port adapters between the two switch fabrics. The mask mechanism processes the bitmap provided by the routing control device before the latter is used for controlling the routing process. FIG. 3 is a schematics view of the structure of a switch core element forming the basis of the switch core 15 or 25. Cells received on any port in a set of 16 input ports can be loaded into cell storage 1 via an associated router in a set of 16 routers 2-i. The cells can be extracted from the cell storage and transferred to output ports via a selector from a set of 16 selectors 3-i. When a cell enters the switch element, a free buffer addresses is retrieved from a free buffer address queue 5 and the incoming cell is routed to the cell storage location identified by the retrieved address. Simultaneously, the SRH value is extracted from the incoming cell and transmitted through a bus 6-i to a mask circuit 100. The mask circuit 100 uses the SRH value in order to generate a corresponding 2 byte mask value which will be provided to a set of 16 gates systems (only gates 7-1 and 7-16 being illustrated). The address at which the cell is being stored is provided at inputs of the gates 7-i via bus 8-i. That address is loaded into one or more output queues 9-1 to 9-16 corresponding to the appropriate output where the cell will have to be routed. When the cell is a multicast cell, the mask circuit 100 provides a duplication value to a counter circuit 110, the duplication value indicating the number of duplication operations that must be performed to satisfy the multicast requirements.

The outgoing process involves the reading of an address in the output queue 9-i, corresponding to the address of storage of the cell within cell storage 1. This address is then presented to the selector 3-i and the cell can be shifted to the appropriate output i. Bus 13 permits the transmission of that address to the counter circuit 110 which is decremented upon each duplication of the cell. When the cell has been copied to every appropriate output port, the count in the counter circuit reaches zero, which triggers a release of the address at which the cell had been stored, making that address available for the storage of a new cell. The released address can be loaded into the free address queue 5 under control of circuit 111.

Figure 4:
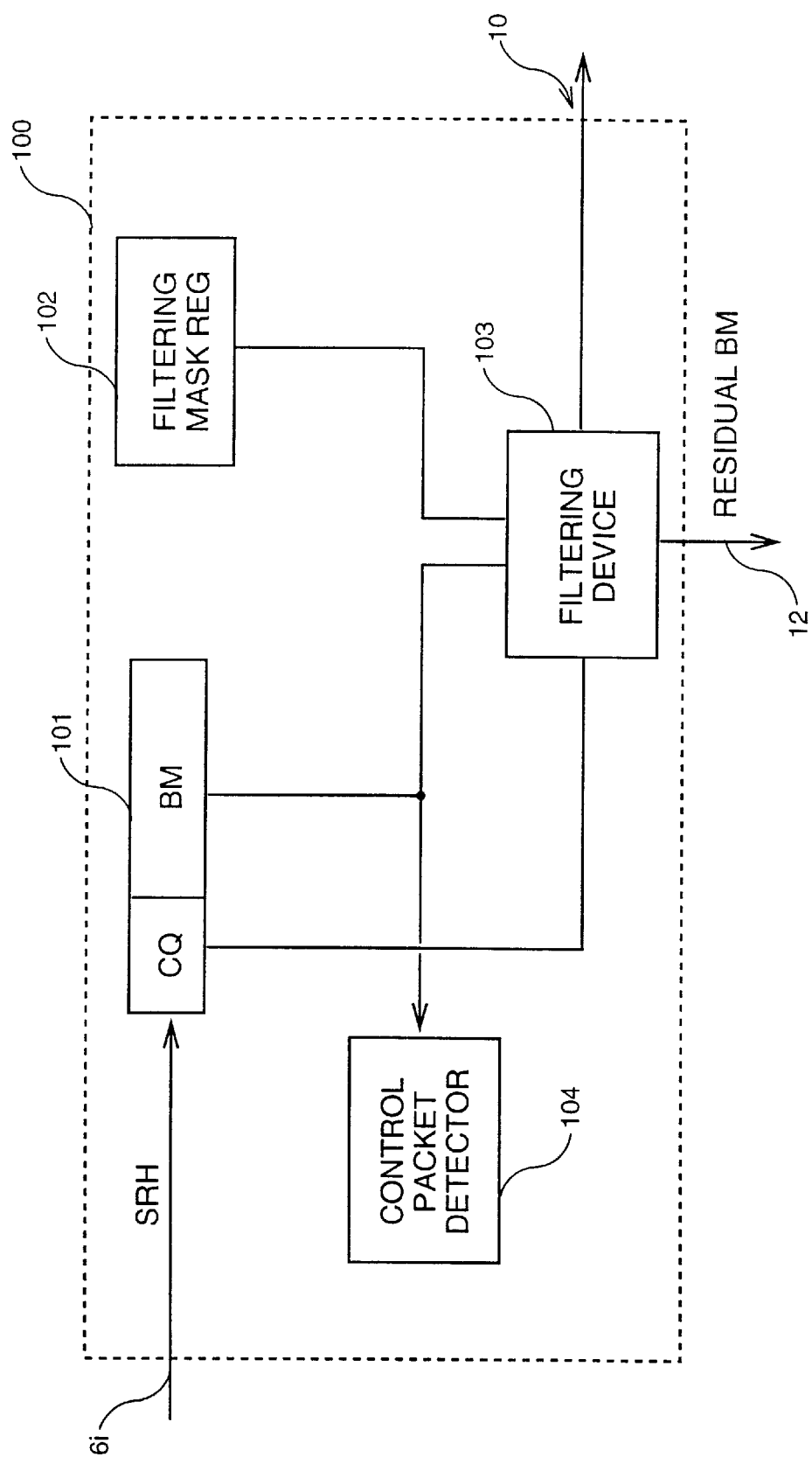
FIG. 4 illustrates a block diagram of a mask circuit used for performing the filtering control field process according to the invention.

FIG. 4 shows a preferred embodiment of the mask circuit 100 which is used in performing steps 403 to 409 of the filtering control field process to be described with reference to FIG. 5. A filtering mask register 102 is loaded by the control processor at the initialization of the circuit. The register 102 contains the two-byte mask that controls the distribution of the output ports into the two Left and Right groups. The SRH value extracted from each received cell is loaded into a register 101 via a bus 6-i. Register 101 stores the cell qualifier and bitmap fields extracted from the cell. The detection of the control packets or cells (corresponding to step 403 of FIG. 5) is performed by circuit 104 which processes the contents of the bitmap field of register 101. The filtering control field in the cell qualifier field is transmitted to the filtering device 103 along with the value of the bitmap and the output from filtering mask register 102. The filtering device 103 can then produce a modified bitmap that will be used by the gating circuits 7-1 to 7-16 so that the address of the current cell will be loaded into the appropriate output queues **9-*i*** in accordance with the bitmap being carried by the cell, and processed in accordance with the mask register contents. This results in cell routing in accordance with the Left and Right repartition of the output groups by the node manager.

Figure 5:
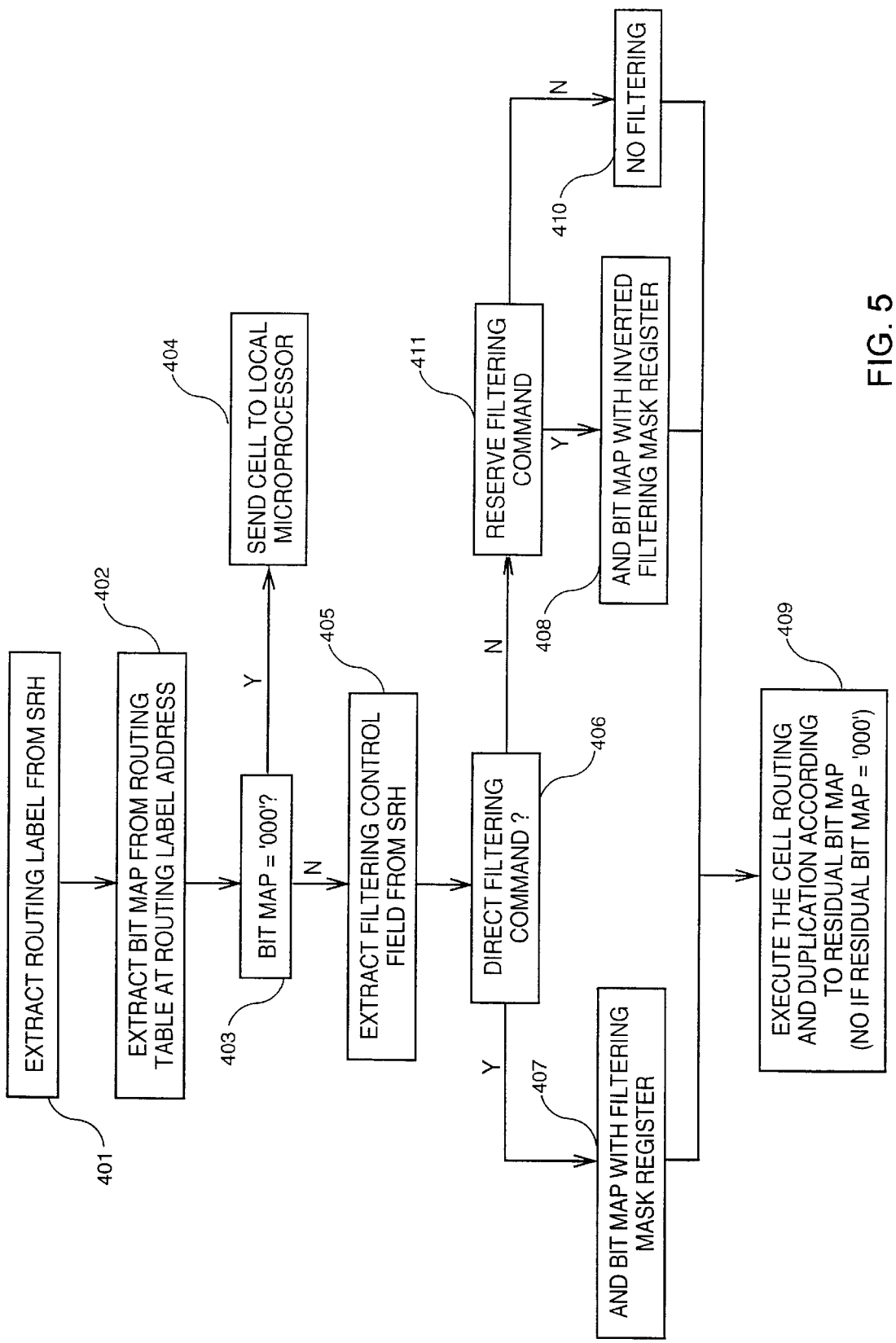
FIG. 5 is a flow chart describing the filtering control field process which is performed within each Switch core.

FIG. 5 shows the distribution process that is used to provide control of LEFT and RIGHT switch cores. This process is being performed in each switch core by mask circuits described earlier with reference to FIG. 4. The process begins at step 401 where the routing label which is contained inside the SRH is extracted from the arriving cell. Then, in step 402, the routing label is used to address the routing table stored in the switch core in order to extract the bitmap which controls the distribution of the cell to the appropriate output ports. It should be noted that, since the same cell is received by the two switch core 15 and 25, step 402 causes the same value of bitmap to be extracted in each switch core. Step 403 is a test which determines whether the extracted bitmap is equal to all zero, which identifies a control cell intended for the local internal processor. Identified control cells are extracted from the flow of data in step 404. If the cell is not a control cell, the process proceeds to step 405 where a filtering control field process is initiated. For that purpose, the above mentioned cell qualifier comprises two particular bits forming a filtering control field which characterizes the filtering operation to be performed for this specific cell.

If the filtering control field indicates a direct filtering operation, as determined by the step 406, then the process proceeds with step 407 where the bitmap which was previously extracted is logically ANDed with the contents of the filtering mask register shown in FIG. 3. As mentioned above (with respect to FIG. 3), the filtering mask register is designed to store a mask value in which each bit is associated with a particular output port of the switch core. As explained above, at initialization of the switch operation, the port adapter Xmit elements are distributed in RIGHT and LEFT Groups. Since the node manager is aware of the resulting topology of the switch, and particularly the physical correspondence between each port adapter Xmit element—either LEFT or RIGHT—and the output ports of each switch core, the value of the mask can be determined as follows. For switch core 15, for each output port, the corresponding bit of the mask is set to one when the SCAL Xmit element 12 has been determined to be active, that is, designated to transmit the normal flow of data to the associated Port Adapter Xmit element. To the contrary, when the SCAL Xmit element is designated as BACKUP, the corresponding bit is set to a zero. Conversely, for Switch core 25, the mask bit that is assigned to a given output port is set to a one when the Port Adapter Xmit Right receives the cell from that specific port. To the contrary, when the output port communicates with a SCAL Xmit element designated as a BACKUP, the corresponding bit is set to a zero. The filtering mask register of the two switch cores 15 and 25 always contain mask values that are complementary to ensure that a complete distribution of the cells through the two switch cores.

Referring to FIG. 5, when the test 406 shows that the value of the filtering control field is not indicative of a direct filtering operation, the process continues with step 411. When the test 411 shows that the value of the filtering control field indicates a reverse filtering operation, the process proceeds with step 408. In step 408, the bitmap which was previously extracted is logically ANDed with the inverted value of the filtering mask register. When the test 411 does not indicate a reverse filtering operation the process proceeds to step 409 through a "no filter" step 410.

XD Step 409 is performed at the completion of either step 407 or 408. The residual bitmap masked in accordance with the above description is used for controlling the routing of the cell inside the two switch cores and also supports the appropriate duplication of a cell in case of multicasting. Where a cell carries a direct filtering command in its filtering control field, the cell is duplicated and provided to both switch fabric paths, but is transmitted only (as a result of step 407) to the appropriate SCAL Xmit element determined by the node manager to be ACTIVE. Conversely, for a cell carrying a reverse filtering command in its filtering control field, that cell is duplicated and provided to both switch fabric paths, but is transmitted only (as a result of step 408) to the appropriate SCAL Xmit element which was defined to be BACKUP.

In the present invention, the direct filtering command is used for the normal traffic of data while the reverse filtering command is reserved for testing of the backup path. To achieve this, testing cells can be periodically injected in the structure and are then transmitted through the backup switch path. The advantage of this approach is that it allows complete testing of the backup components of the backup path, including the backup SCAL Xmit elements and all the backup links, to make sure that, if a breakdown affects one switch core, the remaining switch core will be able to switch all of the cell traffic.

Additionally, since the two switch cores are based on a output shared buffer architecture, as shown on FIG. 3, the active and backup path arrangement in accordance with the present invention results in a virtual increase in the amount of shared cell storage. This improves the overall performance of the switch.

The invention is enhanced by an additional mechanism which prevents two cells, a first direct data cell and a second reverse test cell, from simultaneously arriving at the same port adapter Xmit element. The mechanism includes a control bus **40-*j* in FIG. 1 connecting the SCAL Xmit element 12-*j*, belonging to the switch fabric 10, to the SCAL Xmit element 22-*j* belonging to the switch fabric 20. Two corresponding active and backup SCAL Xmit elements which are connected to a same port adapter Xmit element can communicate via the same control bus 40-*j***.

Bus 40 has two main functions. A first function consists of synchronizing the cell clock of the backup SCAL Xmit element 22*m*, for instance, with that of the clock of the active SCAL Xmit element 12(*m*). In other words, the two links **34-*m* and 35-*m* have cell clocks which are synchronized. The characteristics of transmission of the two links 34-*m* and 35-*m* ensures that the synchronism is maintained up to the input of the port adapter Xmit 31-*m*, which is generally the case when links 34-*m* and 35-*m*** have the same physical length.

A second function is to prevent the simultaneous arrival of two cells at the same port adapter. When the backup SCAL Xmit element **22-*m* wishes to transmit a cell on link 35-*m*, the latter sends a request on bus 40***m* to its associated active SCAL Xmit element **12-*m*. That request is received by active SCAL Xmit element 12-*m* which inhibits the transmission of the cell which would normally be transmitted at the next cell cycle. Concurrently, active SCAL Xmit element 12-*m* sends an acknowledge signal to its associated backup SCAL Xmit element 22**-*m* on bus 40-*m*, which informs the latter that it is allowed to use the link 35-*m* to convey the pending cell at the next cell cycle. The two active and backup mechanisms are enabled in response to the contents of a register defining, under control of the node manager, the appropriate status of the SCAL Xmit element. The mechanism thus prevents the simultaneous arrival of two cells at the same port adapter Xmit element, which gives rise to a substantial advantage in that the port adapter Xmit element can be designed to support only its nominal throughput. Without that mechanism it would be necessary to use adapters being capable of supporting at least twice the nominal throughput, resulting in a strong increase in cost and complexity.

What is claimed is:

1. A cell switching system having:
   a set of input port adapters on which cells may be received, each of said cells including a field having a bitmap value;
   a primary and a secondary output port adapter to which cells may be routed;
   a mask mechanism including a mask register for altering the value of the bitmap; and
   a switch fabric coupled to one of said input port adapters and having a shared buffer which temporarily stores cells which are received, the shared buffer being coupled to a primary and a backup switch core access layer (SCAL) transmit element, the primary SCAL transmit element being coupled to said primary output port adapter and the backup SCAL transmit element being coupled to said secondary output port adapter, said switch fabric further comprises logic which controls the routing of each cell to the primary and the backup SCAL transmit elements as a function of the bitmap value produced by said mask mechanism.

2. A cell switching system having:
   a set of input port adapters on which cells may be received, each of said cells including a field having a bitmap value;
   read logic for extracting the bitmap value from each received cell;
   a set of output port adapters to which cells may be routed;
   first and second switch fabrics, each having a switch core and a set of switch core access layer (SCAL) elements, each SCAL element comprising a SCAL receive element connected to said set of input port adapters and to an input port to one of said switch cores and a SCAL transmit element connected to an output port of one of said switch cores and to said set of output port adapters; and
   a mask mechanism including a mask register for altering the value of the bitmap value to permit the association of the switch cores with different ones of the input port adapters and output port adapters.

3. A cell switching system as defined in claim 1 wherein each output port is associated with an output queue register for storing a succession of addresses identifying the buffer storage location of cells prior to their extraction and delivery to the output port.

* * * * *